United States Patent [19]

Ishizuka et al.

[11] Patent Number: 5,087,109
[45] Date of Patent: Feb. 11, 1992

[54] METHOD FOR COUPLING SEMICONDUCTOR LASER WITH OPTICAL FIBER

[75] Inventors: Satoshi Ishizuka, Hirakata; Kazuro Toda, Katano; Osamu Kato, Yokohama, all of Japan

[73] Assignee: Matsushita Electric Industrial Co., Ltd., Osaka, Japan

[21] Appl. No.: 105,131

[22] Filed: Oct. 6, 1987

[30] Foreign Application Priority Data

Oct. 9, 1986 [JP] Japan ................ 61-240331
Jul. 22, 1987 [JP] Japan ................ 62-182513

[51] Int. Cl.$^5$ ............................................. G02B 6/42
[52] U.S. Cl. ................................ 385/34; 385/52; 385/90
[58] Field of Search ............... 350/96.15, 96.16, 96.17, 350/96.18, 96.20; 250/227, 551, 552; 357/17, 19, 74, 81, 84

[56] References Cited

U.S. PATENT DOCUMENTS 4,270,134 5/1981 Takeda et al. .................. 357/19

FOREIGN PATENT DOCUMENTS 58-132709 8/1983 Japan ................ 350/96.15
58-205120 11/1983 Japan ................ 350/96.18
58-207016 12/1983 Japan ................ 350/96.15
59-87416 5/1984 Japan ................ 350/96.15
60-101509 6/1985 Japan ................ 350/96.15
61-67809 4/1986 Japan ................ 350/96.15

OTHER PUBLICATIONS

Horimatsu et al., "Stabilization of Diode Laser Output by Beveled-End Fiber Coupling", *Applied Optics*, vol. 19, No. 12, Jun. 1980, pp. 1984-1986.

*Primary Examiner*—John D. Lee
*Attorney, Agent, or Firm*—Wenderoth, Lind & Ponack

[57] ABSTRACT

A method and apparatus for coupling a semiconductor laser with an optical fiber in which, in order to prevent deterioration of coupling efficiency due to inclination of the optical fiber input end face for restricting the reflection return light to the semiconductor laser, the position of the semiconductor laser is deviated from the axis of the coupling lens by the value corresponding to the inclination angle of the optical fiber input end face, or the semiconductor laser is inclined. The apparatus includes a device for measuring and adjusting the inclination angle and inclination direction of the optical axis of the output light from the semiconductor laser after passing through the coupling lens.

14 Claims, 6 Drawing Sheets

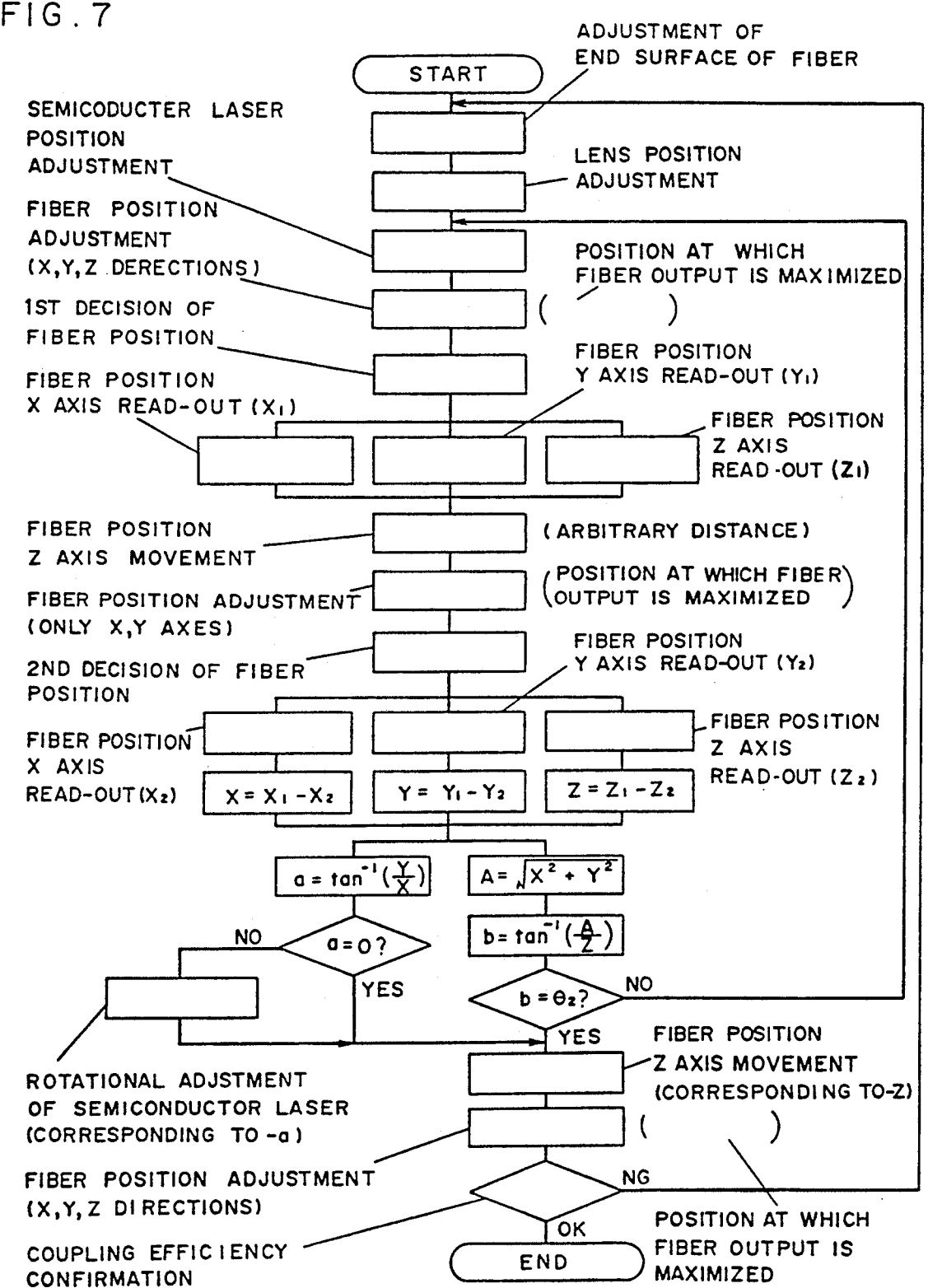

METHOD FOR COUPLING SEMICONDUCTOR LASER WITH OPTICAL FIBER

BACKGROUND OF THE INVENTION

This invention relates to a method for coupling a semiconductor laser used as a source for optical signal transmission such as in an optical communication system and an optical measurement system, with an optical fiber.

A conventional device for coupling a semiconductor laser with an optical fiber is, for example as disclosed in the Japanese Laid-open Patent No. 57-211288, constituted as shown in FIG. 1.

The output light from a semiconductor laser 1 is focused on an input plane 5 of an optical fiber 3 through a coupling lens 2, and is led into a core 4 of the optical fiber 3. Generally, when a semiconductor laser is used as the source for an optical signal transmission system, part of the output light from the semiconductor laser is reflected from the coupling system, and when it returns to the semiconductor laser, it is known to cause problems, such as instability of the oscillation characteristic of the semiconductor laser and increase of noise. In particular, the reflection from the fiber input plane returns at a high percentage, and to solve this problem, the input plane 5 of the optical fiber 3 is inclined so as to prevent the light reflected by this plane from returning to the emission point of semiconductor laser 1.

In such an arrangement, however, as shown in FIG. 2, since the input plane 5 of the optical fiber 3 is oblique, the beam axis 7 of the input light in the optical fiber is inclined by an angle $\phi'$ with respect to the axis of the optical fiber, and the coupling efficiency is lowered accordingly. (This phenomenon is more obvious when a single-mode fiber is used than when a multimode fiber is used.) The angle $\phi'$ is determined, assuming the angle between a plane perpendicular to the axis of the optical fiber of the input plane of the optical fiber to be $\phi$ and the refractive index of the optical fiber to be $n_1$, from the relation according to Snell's law $$\sin\phi = n_1\sin(\phi - \phi') \qquad (1)$$

as $$\phi' = \phi - \sin^{-1}\left(\frac{\sin\phi}{n_1}\right) \qquad (2)$$

SUMMARY OF THE INVENTION

It is hence primary object of this invention to realize a method for coupling a semiconductor laser with an optical fiber excellent in coupling efficiency, capable of preventing the deterioration of the coupling efficiency due to asymmetricity of the numerical aperture of the optical fiber caused by the inclination of the input end face of the optical fiber and also minimizing the reflection returned light to the semiconductor laser.

That is, in this invention, the emission point of the semiconductor laser is spaced from the axis of the coupling lens by a distance corresponding to the inclination angle of the input plane of the optical fiber in the direction of the major axis of the inclined input plane of the optical fiber so that the optical axis of the output light from the semiconductor laser may coincide with the axis of the optical fiber within the optical fiber, or the semiconductor laser is inclined in the direction of the major axis of the input plane of the optical fiber by the angle corresponding to the oblique angle of the input plane of the optical fiber, and a means for measuring and adjusting the inclination angle and inclination direction of the optical axis after passing through the lens of the output light from the semiconductor laser is provided.

While the novel features of the invention are set forth in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 7 is a flow chart to show the outline of the procedure of the coupling method of this invention.

DETAILED DESCRIPTION OF THE PREFERRED EMBODIMENTS

Figure 1:
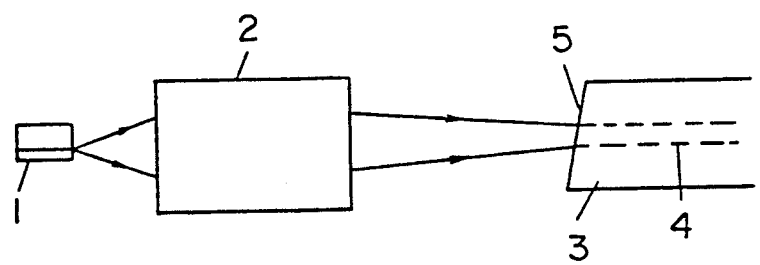
FIG. 1 is a schematic illustration showing a conventional method for coupling a semiconductor laser and an optical fiber.
Figure 2:
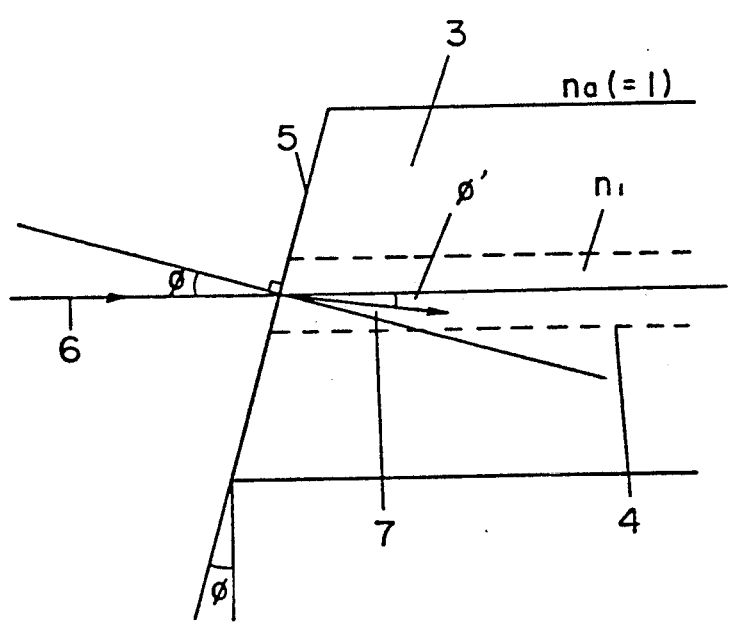
FIG. 2 is an enlarged schematic illustration of essential parts to explain the problems of the conventional method for coupling a semiconductor laser and an optical fiber.
Figure 3:
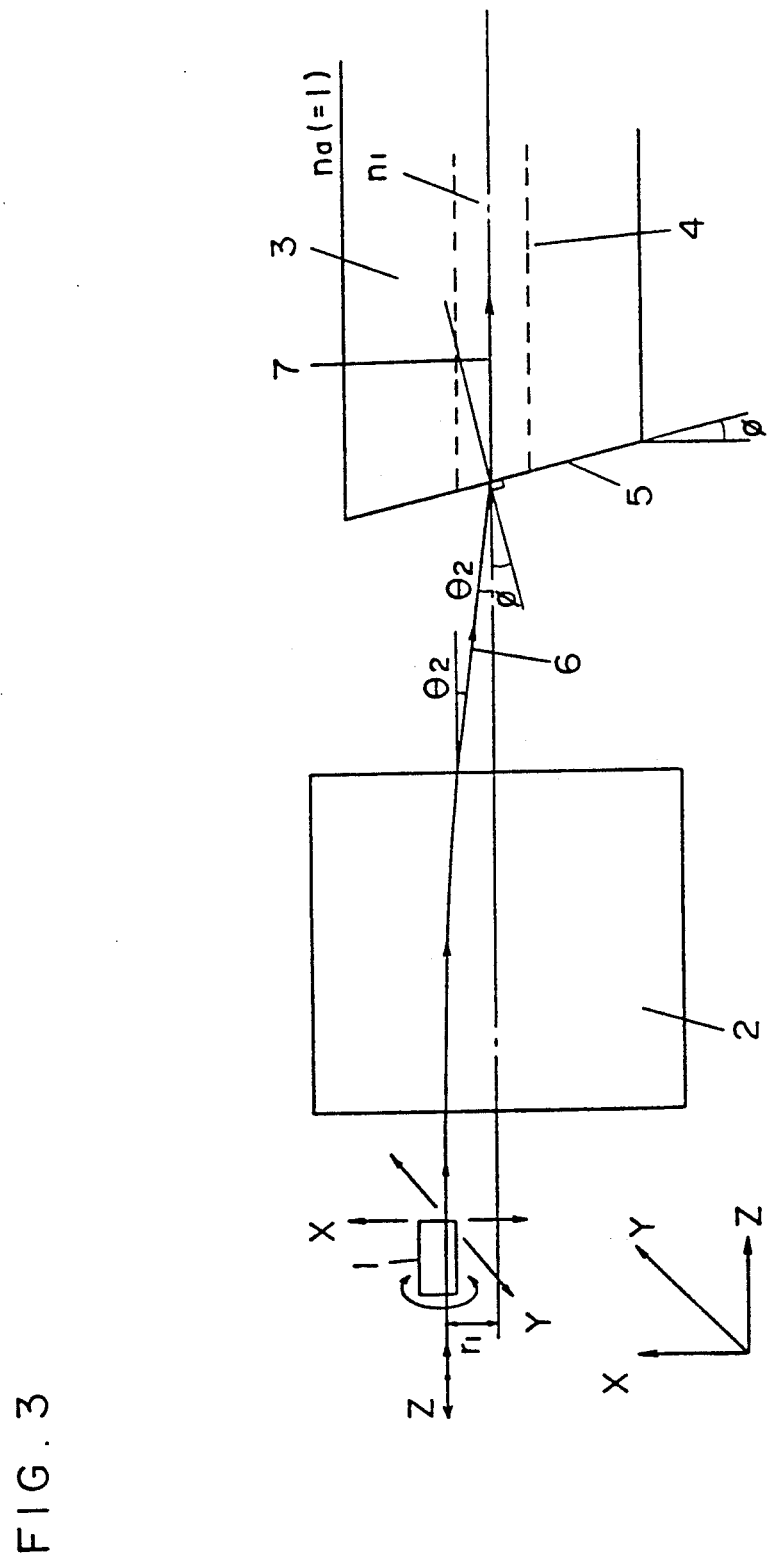
FIG. 3 is a schematic illustration to explain the outline of a method for coupling a semiconductor laser and an optical fiber as one embodiment of this invention.

FIG. 3 shows a coupling device for a semiconductor laser and optical fiber using a GRIN rod lens (graded index rod lens) as the coupling lens in order to explain a method of coupling a semiconductor laser and optical fiber in one of the embodiments of this invention. The output light from a semiconductor laser 1 is focused on an input plane or input end face 5 of an optical fiber 3 through a GRIN rod lens 2, and is transmitted into a core 4 of the optical fiber. The input plane 5 of the optical fiber is inclined by an angle of $\phi$ with respect to a plane perpendicular to the axis of the optical fiber in order to prevent the light reflected here from returning to the semiconductor laser. There will now be described the state in which coupling efficiency is not worsened or deteriorated by the asymmetricity of the numerical aperture of the optical fiber caused by inclination of the input plane or input end face 5 of the optical fiber 3, i.e., the angle $\theta_2$ formed by the optical axis 6 of the optical fiber input light and the axis of the optical fiber 3 in order to match or coincide the direction of the optical axis of the input light in the optical fiber with the axial direction of the optical fiber 3.

In FIG. 3, supposing the refractive index of the core 4 of optical fiber 3 to be $n_1$, according to Snell's law $$\sin(\phi+\theta_2)=n_1\sin\phi \qquad (3)$$

it is determined as follows $$\theta_2=\sin^{-1}(n_1\sin\phi)-\phi \qquad (4)$$

Besides, since this value of $\theta_2$ is equal to the angle formed by the optical axis of output light from the GRIN rod lens 2 and the axis of the lens, the position of the optical axis of the output light from the semiconductor laser at the input plane of the GRIN rod lens can be determined, that is, the distance $r_1$ of the emission point of the semiconductor laser 1 from the lens axis.

The value of $r_1$ to satisfy $\theta_2$ in the above equation is described below.

In the GRIN rod lens, supposing the distance of the beam at the lens input plane from the lens axis to be $r_1$, the input angle with respect to the lens axis to be $\theta_1$, the distance of the beam at the lens output plane from the lens axis to be $r_2$, and the output angle with respect to the lens axis to be $\theta_2$, the following relation is established $$\begin{pmatrix} r_2 \\ \theta_2 \end{pmatrix} = \begin{pmatrix} \cos\sqrt{A}\,Z & \frac{1}{n_0\sqrt{A}}\sin\sqrt{A}\,Z \\ -n_0\sqrt{A}\sin\sqrt{A}\,Z & \cos\sqrt{A}\,Z \end{pmatrix} \cdot \begin{pmatrix} r_1 \\ \theta_1 \end{pmatrix} \quad (5)$$

where $\sqrt{A}$ is the refractive index distribution constant of the GRIN rod lens, $n_0$ is the refractive index on the lens axis, and Z is the length of GRIN rod lens. Incidentally, in the case of FIG. 3, $\theta_1$ is zero. From equations (4) and (5), it follows that $$r_1 = \frac{\sin^{-1}(n_1\sin\phi) - \phi}{n_0\sqrt{A}\sin\sqrt{A}\,Z} \quad (6)$$

Namely, corresponding to the inclination angle $\phi$ of the optical fiber input end plane, the emission point of the semiconductor laser is disposed at a position remote from the lens axis by distance $r_1$ to satisfy equation (6) in the direction of the major axis of the inclined input end face of the optical fiber, and a favorable coupling efficiency is obtained.

For example, using a GRIN rod lens with a length of 3.8 mm, refractive index on the axis of 1.592, and refractive index distribution constant of 0.327, when the inclination angle between a plane perpendicular to the optical fiber axis and the optical fiber input end face is 8°, and the refractive index of the core of the optical fiber is 1.462, the emission point of the semiconductor laser is disposed at a position spaced by about 125 μm from the lens axis in the direction of the major axis of the inclined input end face of the optical fiber from equation (6).

Figure 4:
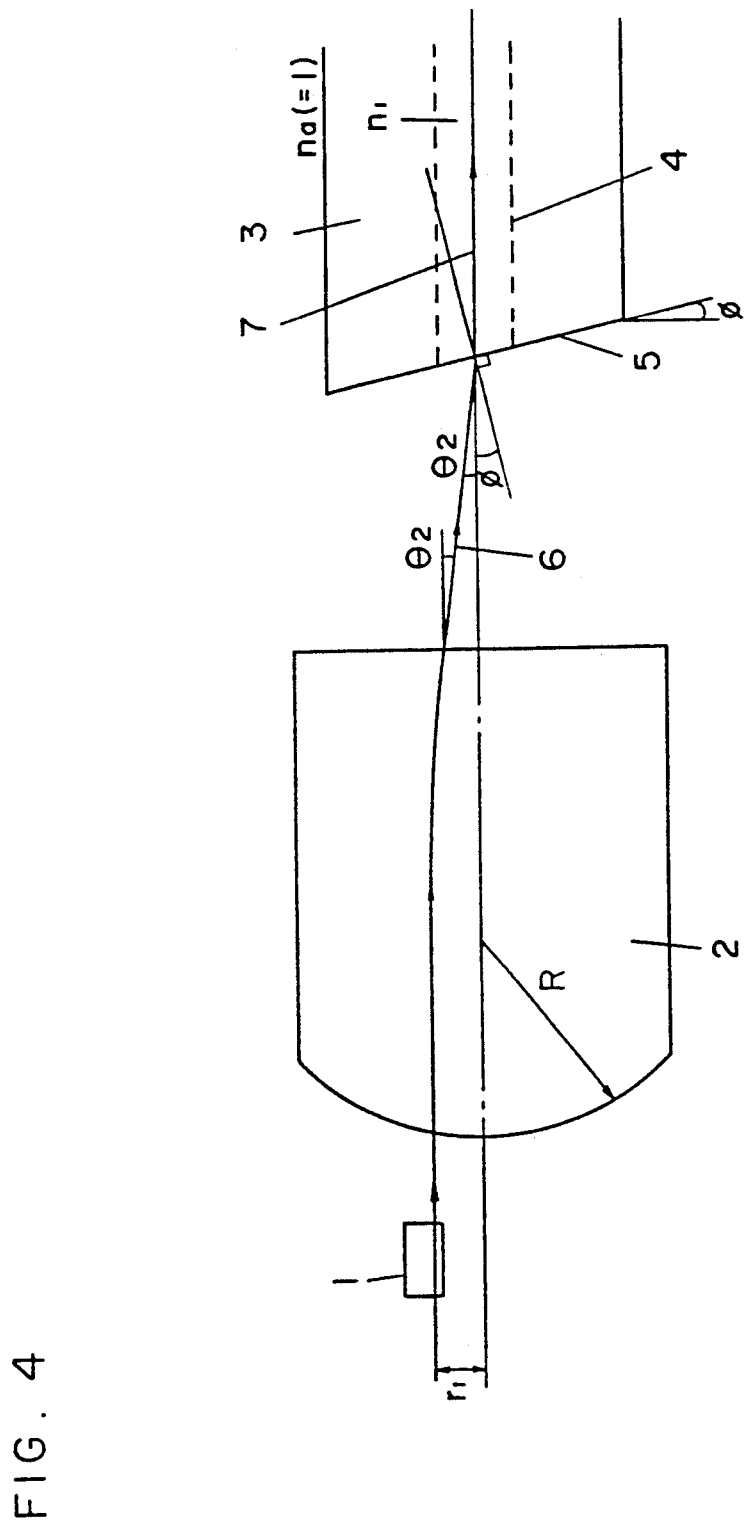
FIG. 4 is a schematic illustration to explain the outline of another embodiment of this invention.

FIG. 4 shows a second embodiment using a hemispherical GRIN rod lens as the coupling lens. In the same manner as shown in FIG. 3, the output light from the semiconductor laser 1 is focused on the input plane 5 of the optical fiber by the hemispherical GRIN rod lens having an input plane which has a radius of curvature of R. In the case of the hemispherical GRIN rod lens, similar to FIG. 3, supposing the distance of the beam at the lens input plane from the lens axis to be $r_1$, the input angle to the lens axis to be $\theta_1$, the distance of the beam at the lens output plane from the lens axis to be $r_2$, and the output angle to the lens axis to be $\theta_2$, their relation is expressed as follows, in the product of the beam matrix of the spherical boundary possessing the radius of curvature R and the beam matrix at the GRIN rod lens.

$$\begin{pmatrix} r_2 \\ \theta_2 \end{pmatrix} = \begin{pmatrix} \cos\sqrt{A}\,Z & \frac{1}{\sqrt{A}}\sin\sqrt{A}\,Z \\ -n_0\sqrt{A}\sin\sqrt{A}\,Z & n_0\cos\sqrt{A}\,Z \end{pmatrix} \begin{pmatrix} 1 & 0 \\ \frac{(1-n_0)}{n_0 R} & \frac{1}{n_0} \end{pmatrix} \begin{pmatrix} r_1 \\ \theta_1 \end{pmatrix} = $$

$$\begin{pmatrix} \cos\sqrt{A}\,Z + \frac{(1-n_0)\sin\sqrt{A}\,Z}{n_0\sqrt{A}\,R} & \frac{\sin\sqrt{A}\,Z}{n_0\sqrt{A}} \\ -n_0\sqrt{A}\sin\sqrt{A}\,Z + \frac{(1-n_0)\cos\sqrt{A}\,Z}{R} & \cos\sqrt{A}\,Z \end{pmatrix} \begin{pmatrix} r_1 \\ \theta_1 \end{pmatrix} \quad (7)$$

In equation (7), assuming $\theta_1=0$, and from also equation (4), $r_1$ is determined as follows.

$$r_1 = \frac{R\{\sin^{-1}(n_1\sin\phi) - \phi\}}{(1-n_0)\cos\sqrt{A}\,Z - n_0 R\sqrt{A}\sin\sqrt{A}\,Z} \quad (8)$$

For example, using a hemispherical GRIN rod lens with a length of 3.0 mm, refractive index on the axis of 1.636, radius of curvature of the hemisphere of 2.0 mm, and refractive index distribution constant of 0.412, if the optical fiber has an inclination angle of the input end plane of 8° as in FIG. 3, and the core refractive index is 1.462, $r_1$ is found to be 88.4 μm from equation (8).

Figure 5:
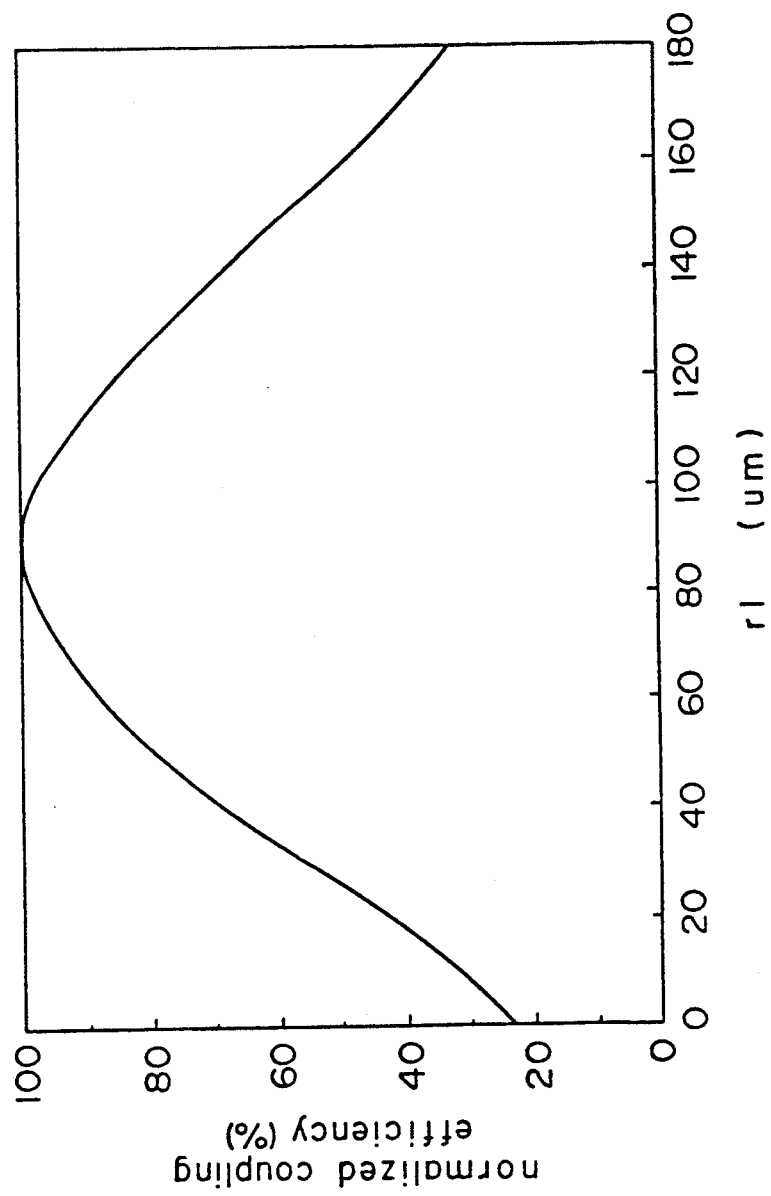
FIG. 5 shows a characteristic of the experimental results based on the embodiment in FIG. 4.

FIG. 5 shows the result of an experiment, conforming to an embodiment of this invention, of determining the relation of the coupling efficiency of the output light from the semiconductor laser to the optical fiber, with respect to the distance $r_1$ from the axis of the coupling lens (hemispherical GRIN rod lens) to the semiconductor laser emission point in the constitution shown in FIG. 4. As clear from FIG. 5, the value of $r_1$ where the coupling efficiency is maximum coincides very well with the calculation result of equation (8).

Figure 6:
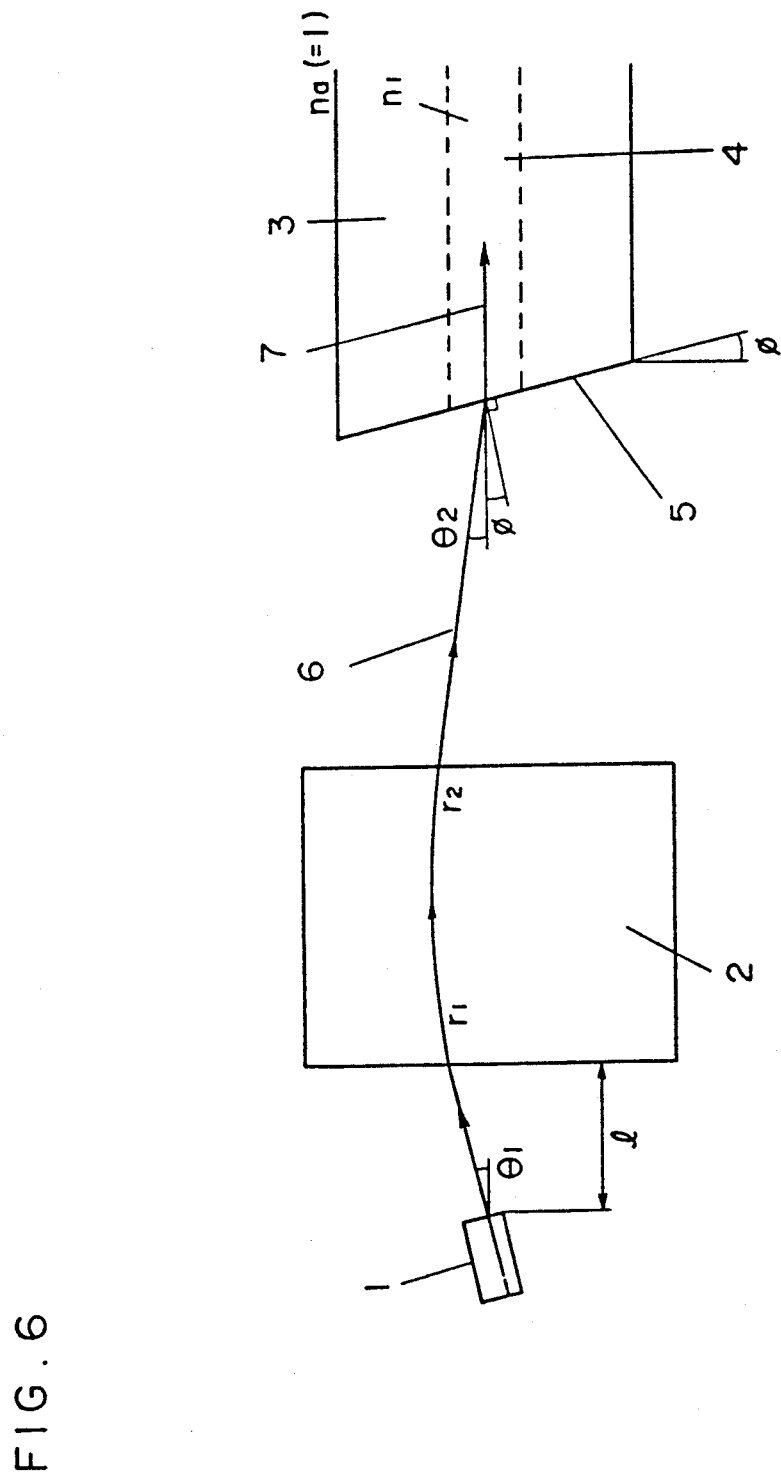
FIG. 6 is a schematic illustration to explain the outline of another embodiment of this invention.

A further different embodiment of the invention is shown in FIG. 6.

That is, in FIG. 6, supposing the distance of the beam at the lens input plane of the GRIN rod lens from the lens axis to be $r_1$, the input angle of the lens to the axis to be $\theta_1$, the distance of the beam at the lens output plane from the lens axis to be $r_2$, and the output angle to the lens axis to be $\theta_2$, the relation expressed in equation (5) is established as in FIG. 3.

Besides, supposing the distance between the semiconductor laser 1 and the GRIN rod lens 2 to be l, the following relation is established.

$$r_1 = l\cdot\tan\theta_1 \quad (9)$$

From equation (5), it follows that $$\theta_2 = \theta_1 \cdot \cos\sqrt{A}\, Z - r_1 n_0 \sqrt{A}\, \sin\sqrt{A}\, Z \quad (10)$$

and from equations (9) and (10), the relation between $\theta_1$ and $\theta_2$ is established as follows:

$$\theta_2 = \theta_1 \cdot \cos\sqrt{A}\, Z - l \cdot \tan\theta_1 \cdot n_0 \cdot \sqrt{A} \cdot \sin\sqrt{A}\, Z \quad (11)$$

That is, equation (11) determines the value of $\theta_2$ to obtain a favorable coupling efficiency, by selecting the angle $\theta_1$ with respect to the lens axis of the optical axis of the output light from the semiconductor laser 1, depending on the distance l between the semiconductor laser 1 and the GRIN rod lens 2.

One of the embodiments of the procedure for coupling the semiconductor laser with an optical fiber according to this invention is shown in the flow chart of FIG. 7 on the basis of FIG. 3.

In FIG. 3, the direction perpendicular to the optical axis of the GRIN rod lens 2 and the inclination direction of the input plane 5 of the optical fiber is defined as the X-axis direction, the direction perpendicular to the optical axis of the GRIN rod lens 2 and orthogonal to the inclination angle of the input plane 5 of the optical fiber is the Y-axis direction, and the direction of the optical axis of the GRIN rod lens 2 is the Z-axis direction.

From FIG. 3 and FIG. 7, the procedure of performing the coupling method of this invention is described below.

(1) The inclination angle direction of the optical fiber input plane 5 is adjusted to be matched with the X-axis direction shown in FIG. 3.

(2) The position of the lens 2 with respect to the semiconductor laser 1 is adjusted and it is installed so as to obtain a desired interval between the lens 2 and optical fiber input plane 5.

(3) The semiconductor laser 1 is positioned and installed.

(4) The position of the optical fiber 3 is adjusted so that the optical fiber output may be maximum at this point, and this position is set as the primary determination position.

(5) The fixing jig graduation at the position of the optical fiber 3 at this time is read on the X-axis, Y-axis, and Z-axis, and the readings are respectively $X_1$, $Y_1$, $Z_1$.

(6) The position of the optical fiber 3 is moved by a desired distance in the Z-axis direction.

(7) The position of the optical fiber 3 is adjusted on the X-axis and Y-axis only so that the optical fiber output may be maximum at this point, and this position is set as the secondary determination position.

(8) the fixing jig graduation at the position of the optical fiber 3 at this time is read on the X-axis, Y-axis, and Z-axis, and the readings are respectively $X_2$, $Y_2$, $Z_2$.

(9) Calculating $(X_1-X_2)$, $(Y_1-Y_2)$, $(Z_1-Z_2)$, X, Y, Z are obtained.

(10) Calculating $$\tan^{-1}\left(\frac{Y}{X}\right),$$

"a" is obtained.

(11) Calculating $$\sqrt{X^2 + Y^2},$$

A is obtained.

(12) Calculating $$\tan^{-1}\left(\frac{A}{Z}\right).$$

"b" is obtained.

That is, "a" denotes the deviation angle of the inclination direction of the output light from the lens 2 with respect to the inclination angle of the optical fiber input plane 5, and "b" expresses the inclination angle of the output light from the lens 2.

(13) Judging a=0 or a≠0, if a≠0, the semiconductor laser 1 is rotated, as shown in FIG. 3, by an angle corresponding to −a parallel to the plane perpendicular to the optical axis of the lens 2.

(14) Judging b=$\theta_2$ or b≠$\theta_2$, if b≠$\theta_2$ the operation returns to step (3), and the subsequent steps are repeated.

(15) If a=0 and b=$\theta_2$, at this moment, the inclination angle of the input plane 5 of the optical fiber and the inclination direction of the output light from the lens 2 are matched, and the inclination angle of the output light from the lens 2 is judged to be optimum.

(16) The position of the optical fiber 3 is moved, only in the Z-axis direction, by −Z, thereby returning to the initial value $Z_1$ in step (6).

(17) The position of the optical fiber 3 is adjusted again, on the X-axis, Y-axis and Z-axis, so that the optical fiber output may be maximum.

(18) Confirming the coupling efficiency, if a desired value is not obtained, the operation returns to the start, and the subsequent steps are repeated. If a desired value is obtained, the operation ends on the spot.

While specific embodiments of the invention have been illustrated and described herein, it is realized that other modifications and changes will occur to those skilled in the art. It is therefore to be understood that the appended claims are intended to cover all modifications and changes as fall within the true spirit and scope of the invention.

We claim:

1. A semiconductor laser module, comprising: a semiconductor laser for outputting a laser beam; an optical fiber having an input inclined end face thereof inclined to a plane perpendicular to a center axis of the optical fiber;

a coupling lens disposed between said semiconductor laser and optical fiber for passing said laser beam outputted from said semiconductor laser therethrough and for focusing said laser beam onto the input inclined end face of the optical fiber;

wherein, said laser beam outputted from said semiconductor laser passes through said coupling lens, and is inputted into said optical fiber and transferred through said optical fiber as a transferring light, and wherein said semiconductor laser is positioned at a position away from the center axis of said coupling lens in such manner that an optical axis of said transferring light transferring in said optical fiber is coincident with the center axis of the optical fiber, thereby maximizing a coupling efficiency of said semiconductor laser, coupling lens and optical fiber.

2. The semiconductor laser module of claim 1, wherein the optical axis of the output light from the semiconductor laser is at an angle to the axis of the coupling lens.

3. The semiconductor laser module of claim 2, further comprising means for adjusting the angle between the optical axis of the output light from the semiconductor laser and the axis of the coupling lens.

4. The semiconductor laser module of claim 1, wherein the angle between the axis of the coupling lens and the optical axis of the output light from the semiconductor laser is other than 0 degrees.

5. The semiconductor laser module of claim 1, wherein the optical axis of the output light from the semiconductor laser is parallel to the axis of the coupling lens.

6. The semiconductor laser module of claim 1, wherein the coupling lens is a hemispherical graded index rod lens.

7. The semiconductor laser module of claim 1, wherein the coupling lens is a graded index rod lens.

8. The semiconductor laser module of claim 1, further comprising means for adjusting the distance between the optical axis of the output light from the semiconductor laser and the axis of the coupling lens.

9. A semiconductor laser module, comprising:
a semiconductor laser for outputting a laser beam;
an optical fiber having an input inclined end face thereof inclined to a plane perpendicular to a center axis of the optical fiber;
a coupling lens disposed between said semiconductor laser and optical fiber such that a center axis of the coupling lens is coincident with the center axis of the optical fiber, for passing said laser beam outputted from said semiconductor laser therethrough and for focusing onto the input inclined end face of the optical fiber;
wherein said laser beam passes through said coupling lens and is inputted into said optical fiber and transferred through said optical fiber as a transferred light and wherein said semiconductor laser is positioned at a position away from the center axis of said coupling lens such that an optical axis of said transferred light traveling in said optical fiber is coincident with the center axis of the optical fiber thereby maximizing coupling efficiency of said semiconductor laser, coupling lens and optical fiber.

10. A method for coupling a semiconductor laser with an optical fiber comprising the steps of:
arranging a semiconductor laser, an optical fiber having an input end face thereof inclined to a plane perpendicular to an axis of the optical fiber and a coupling lens for focusing an output light from the semiconductor laser onto the light end face of the optical fiber such that output light from the semiconductor laser is transferred into the optical fiber after passing through the coupling lens and such that an axis of the coupling lens is coincident with the axis of the optical fiber; and
adjusting a position of the semiconductor laser such that an optical axis of an input light in the optical fiber is coincident with the axis of the optical fiber.

11. The method of claim 10, wherein said adjusting step is carried out by spacing the optical axis of the output light from the semiconductor laser a distance from the axis of the coupling lens such that the optical axis of the input light in the optical fiber is coincident with the axis of the optical fiber.

12. The method of claim 11, wherein said distance extends radially away from the axis of the coupling lens in the same direction that the part of the input end face of the optical fiber closest to the coupling lens extends away from the axis of the optical fiber.

13. The method of claim 10, wherein said adjusting step is carried out by adjusting an angle between the optical axis of the output light from the semiconductor laser and the axis of the coupling lens.

14. The method of claim 13, wherein the angle between the optical axis of the output light from the semiconductor laser and the axis of the coupling lens is measured in a plane parallel to the axis of the coupling lens and in which extends an angle between the input end face of the optical fiber and a normal to the axis of the optical fiber.

* * * * *